3,155,715
PREPARATION OF DIALKYL ESTERS OF
TEREPHTHALIC ACID
Alan E. Ardis, Hamden, and Alexander A. Vaitekunas, New Haven, Conn., assignors, by mesne assignments, to Socony Mobil Oil Company, Inc., a corporation of New York
No Drawing. Filed Sept. 30, 1959, Ser. No. 843,347
3 Claims. (Cl. 260—475)

The present invention relates to an improved process for dialkyl esters of terephthalic acid, particularly of the preparation of alkyl terephthalates in which alkyl group contains one to four carbon atoms.

It is known that dialkyl esters of terephthalic acid can be produced by reacting said acid with an aliphatic alcohol containing 1–4 carbon atoms per molecule in the presence of concentrated sulfuric acid. In this esterification which has to be carried out with a large excess of alcohol and in the presence of high ratios of sulfuric acid, considerable losses of alcohol are involved because of dialkyl ether formation in large quantities during the extended period required for the esterification.

It has been the main object of this invention to provide an improved process for the esterification of terephthalic acid with a lower aliphatic alcohol in the presence of small amounts of catalyst without by-product formation and in a short time. A further object has been to provide a rapid process for the preparation of dialkyl terephthalates at temperatures not higher than about 110° C.

The foregoing and other objects have been accomplished in accordance with this invention by carrying out the esterification process in the presence of isophthalic acid and a small amount of sulfuric acid as catalyst. Part or all of the isophthalic acid may be replaced by a dialkyl isophthalate, the alkyl containing 1 to 4 carbon atoms.

Best results in accelerating the desired esterification are obtainable with the use of 1 to 5 moles, preferably 3 moles, of isophthalic acid or dialkyl ester thereof to 5 moles of terephthalic acid. Sulfuric acid should be present in an amount corresponding to about 0.2 to 0.7 part by weight of concentrated sulfuric acid per part by weight of terephthalic acid. The esterifying alcohol such as methanol, ethanol, iso- or n-propanol or n-butanol should be present at a proportion of at least 5 parts and up to about fifty parts by weight of alcohol per part of terephthalic acid, about ten parts of alcohol per part by weight of terephthalic acid being preferred for best results.

With the use of reaction mixtures as specified above, the esterification may be accomplished to substantially quantitative conversion in one-half to two hours reaction time at temperatures of 60° C. to 110° C. and with substantially no formation of ethers or other wasteful by-product. When the esterification is carried out at the higher temperatures within the above range, at about 100° C., the sulfuric acid is preferably diluted with about an equal weight of water. When the esterification temperature exceeds the normal boiling point of the alcohol used, the reaction is preferably carried out in a sealed vessel at a pressure somewhat above atmospheric, corresponding to the vapor pressure of the alcohol.

The following specific examples constitute illustrative embodiments of the invention. Unless otherwise indicated, the proportions of ingredients are given by weight.

*Example 1*

Terephthalic acid (25 parts) was mixed with 25 parts of isophthalic acid, 400 parts of methanol and 15 parts of concentrated sulfuric acid and the mixture was heated at atmospheric pressure at the boiling point (about 64° C.) during agitation in a vessel provided with a reflux condenser. A clear solution resulted in two hours, the mixture being then poured into about a liter of cold water. Dimethyl terephthalate precipitated, and after being washed with water and dried, it was crystallized from solution in methanol. After drying, 28 parts (95.5% of theoretical yield) of purified dimethyl terephthalate displaying a melting point of 140.6° C. were obtained, the product being readily capable of conversion by conventional means to substantially colorless ethylene terephthalate polymer yielding strong film and filaments.

Under identical conditions and procedure, except that the isophthalic acid was omitted, from the reaction mixture, 10 hours of agitation of the reaction mixture under reflux were required for the dissolution of the terephthalic acid, significant amounts of dimethyl ether being formed.

*Example 2*

A mixture of 50 parts of commercial grade terephthalic acid (96% TPA), 500 parts of methanol, 60 parts of dilute sulfuric acid (30 parts of concentrated sulfuric acid, sp. gr. 1.84, and 30 parts of water) and 20 parts of dimethyl isophthalate was placed in a one liter stainless steel autoclave which was equipped with a stirrer, thermometer and water cooling coil. The contents were heated to 105° C. and the temperature was maintained for 60 minutes during agitation. Then, the reaction was quenched by cooling the vessel to 35°–40° C. The autoclave pressure was released through three traps cooled with Dry Ice in acetone. No condensate was collected, thus indicating that only minute amounts, if any, of dimethyl ether were formed under the above esterification conditions.

On isolation of reaction products, 55 parts (98.5% of theroretical yield) of dimethyl terephthalate (melting point 140.6° C.) were obtained. The filtrate of the dimethyl terephthalate cake, after removal of methanol by distillation, separated into two layers:

(a) The upper layer (diester layer) amounted to 22.3 parts
(b) The lower layer contained 25.5 parts of sulfuric acid, 2.5 parts of half esters, 6.3 parts of dimethyl isophthalate and 5.1 parts of water.

The diester layer, after washing with 5% sodium carbonate, distilled water and drying, weighed 20 parts and was essentially dimethyl isophthalate.

When the foregoing example was repeated, except for the omission of the dimethyl isophthalate from the reaction mixture, only a 76% of theoretical yield of impure dimethyl terephthalate was obtained (melting point 125° C.)

Similarly, the advantages of improved yields of dialkyl terephthalate, shorter reaction periods, and lack of by-product formation are obtainable with the use of isophthalic acid or lower dialkyl esters thereof, as specified above, in the esterification of terephthalic acid with ethanol, n-propanol, isopropanol and n-butanol.

While the process is well adapted for batch operation, it is also advantageously applicable in continuous esterification procedures, as the reaction mixture may be recovered and recycled in the process.

What is claimed is:

1. In the preparation of dialkyl terephthalate, the process comprising reacting terephthalic acid with five to about fifty times its weight of an alkanol containing 1 to 4 carbon atoms at a temperature of 60° C. to 110° C. for one-half to two hours in the presence of about 0.6 parts of sulfuric acid per part by weight of terephthalic acid and in the presence of 0.2 to 2 mole of isophthalic derivative per mole of terephthalic acid, said isophthalic derivative being chosen from the group consisting of isophthalic acid and a 1 to 4 carbon alkyl ester thereof.

2. In the preparation of adialkyl terephthalate, the process comprising reacting terephthalic acid with about ten parts its weight of an alkanol containing 1 to 4 carbon atoms at a temperature of 60° C. to 110° C. for about one-half to two hours in the presence of about 0.6 part by weight of sulfuric acid per part by weight fo terephthalic acid and in the presence of about 0.6 mole of isophthalic acid per mole of terephthalic acid.

3. In the preparation of dimethyl terephthalate, the process comprising reacting terephthalic acid with about ten times its weight of methanol at a temperature of 60° C. to 110° C. for about one-half to two hours in the presence of about 0.6 part by weight sulfuric acid per part by weight of terephthalic acid and in the presence of about 0.6 mole of isophthalic acid per mole of terephthalic acid.

References Cited in the file of this patent

UNITED STATES PATENTS

| | | |
|---|---|---|
| 2,459,014 | Cavanaugh et al. | Jan. 11, 1949 |
| 2,656,377 | Pino | Oct. 20, 1953 |
| 2,733,266 | McKinnis | Jan. 31, 1956 |
| 2,858,334 | Landau et al. | Oct. 28, 1958 |
| 2,936,320 | Benoit | May 10, 1960 |

UNITED STATES PATENT OFFICE
CERTIFICATE OF CORRECTION

Patent No. 3,155,715                      November 3, 1964

Alan E. Ardis et al.

It is hereby certified that error appears in the above numbered patent requiring correction and that the said Letters Patent should read as corrected below.

Column 2, line 70, for "0.2 to 2 mole" read -- 0.2 to 1 mole --; column 3, line 2, for "adialkyl" read -- a dialkyl --; line 7, for "fo" read -- of --.

Signed and sealed this 13th day of April 1965.

(SEAL)
Attest:

ERNEST W. SWIDER                          EDWARD J. BRENNER
Attesting Officer                            Commissioner of Patents